No. 847,544. PATENTED MAR. 19, 1907.
C. S. BAVIER.
LUBRICATING DEVICE.
APPLICATION FILED JULY 12, 1906.
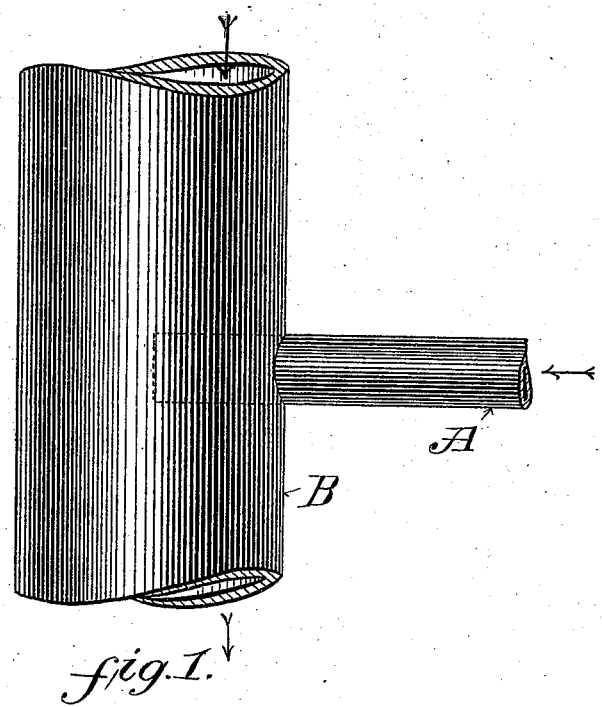
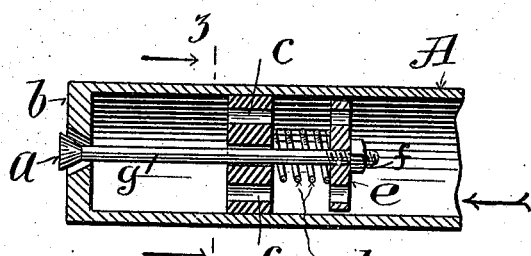 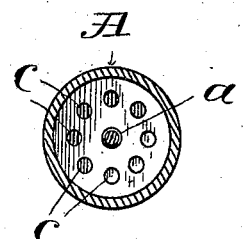

UNITED STATES PATENT OFFICE.

CHARLES S. BAVIER, OF NEW YORK, N. Y.

LUBRICATING DEVICE.

No. 847,544.  Specification of Letters Patent.  Patented March 19, 1907.

Application filed July 12, 1906. Serial No. 325,795.

*To all whom it may concern:*

Be it known that I, CHARLES S. BAVIER, a citizen of the United States of America, and a resident of the borough of Manhattan, city, county, and State of New York, have invented certain new and useful Improvements in Lubricating Systems and Apparatus, of which the following is a specification.

This invention relates to improvements in lubricating devices.

In particular it pertains to those devices in which the oil is forced by a "positive feed," such as an oil-pump, or some other oil-forcing device, from a source of supply into a steam-pipe, steam-chest, cylinder, or other part of the machinery, where the oil is vaporized and carried along with the steam to the parts to be lubricated. For sake of brevity I hereinafter designate such steam-pipe, steam-chest, cylinder, or other part of the machinery by the generic term "steam-chamber," and the invention is applicable to gasolene and other vapor engines, as well as to steam-engines.

The invention relates to means for obtaining better distribution of lubricating-oils in the interior of engines, where the flow and temperature of the gas, steam, or vapor is depended upon to convey and diffuse the lubricant on the rubbed surfaces or moving parts of engine pistons and valves. Its essential feature consists of an orifice at the terminal oil-delivery into such interiors, which is closed by a valve loaded to cause a resistance to the oil flowing through the orifice, whereby the oil is caused to spray and atomize at the delivery-outlet. The object attained by such action is more perfect diffusion of the oil into the flowing vapor, and its consequent better distribution on the surfaces requiring lubrication, for experience has shown that the devices heretofore employed to atomize the oil cannot be relied on to do so under varying conditions of load, &c., on the engine and oil-pumps, and that supposing the oil to be properly atomized in certain conditions it will not be so in certain other conditions. I have, however, determined that excellent results can be obtained if the lubricant is atomized in flowing steam and thoroughly diffused therethrough, or, as I term it, if the steam is "saturated" with the oil. If this be achieved, then the steam becomes an excellent carrier of the oil to all the parts of the engine which require lubrication; but in order that the steam may be an efficient oil-carrier the oil must be thoroughly atomized and diffused in the steam at the instant of entering the steam-chamber, and this invention by interposing a variable resistance to the flow of the oil precisely at the terminal of the oil-conduit properly diffuses the oil just as it enters the steam and without the possibility of the oil again coalescing into drops, and the result is the complete atomizing of oil in the steam, its rapid proper transfer throughout the engine, and the lubricating of all parts needing lubrication.

Manifestly no particular form or construction of positive feeding devices for the oil is necessary, any oil-pump being capable of feeding the oil, nor is any especial type of valve indispensable, various kinds of valves being available; but it is essential that the valve be loaded so as to tend to close against the oil-pressure and be located at the terminal of the oil-conduit in a steam-space. In the drawings which accompany this specification I have therefore not indicated an oil-pump, since the use of the same will be well understood to those versed in the art, and I have illustrated a well-known form of spring-pressed valve seating on a conical seat against the oil-pressure.

Referring to the said drawings, Figure 1 is a broken elevation of a steam-pipe and an oil-conduit provided with the invention. Fig. 2 is an enlarged section of the end of the oil-conduit and the valve, the steam-pipe not being shown. Fig. 3 is a cross-section on the plane 3 3 of Fig. 2.

A is a conduit from any positive oil-feeding device, as an oil-pump, (not shown,) and deriving its supply from a tank or other source of oil. (Also not shown.) Said pipe A enters into the steam-space represented in Fig. 1 as a steam-pipe B. On the end of conduit A in said steam-pipe B is a conical valve *a*, seating on a seat *b*, *d* being a spring which tends to close valve *a* against the incoming oil, the valve-stem *g* being guided through the perforated diaphragm *c c* by the perforated washer *e*. The tension of the spring *d* can be adjusted by the nut *f*, and the valve be thereby adapted to atomize oil over a wide range of pump-pressure.

Supposing the engine at rest and there being no need for lubricating, the oil-feeding device will also be at rest and the valve *a* will then close on its seat; but whenever the oil-feeding device is operating the said valve will open proportionately to the pressure of the oil on the valve, and the resistance thus offered by the valve to the flow of the oil will cause the oil to diffuse over the periphery of said valve and to issue into the steam in a thin atomized film, which is at once taken up and completely vaporized by the steam and by it conveyed to the parts to be lubricated, as the surfaces of a cylinder, piston, piston-rod, and other working parts of the engine.

Now, having described my improvements, I claim as my invention—

1. The combination in lubricating apparatus of a steam-chamber, a conduit for a lubricant connected therewith, and an adjustable closure at the terminal of said conduit in said steam-chamber, substantially as described.

2. The combination in lubricating apparatus, of a steam-chamber, a conduit for supplying lubricant to said steam-chamber, and a terminal closure on said conduit in said steam-chamber arranged to open automatically by the pressure of the lubricant and admit atomized oil into said steam-chamber, substantially as described.

3. The combination in lubricating apparatus, of a steam-chamber, a conduit for delivering lubricant into said steam-chamber, and an adjustable closure at the extremity of said conduit in said steam-chamber adapted to atomize the lubricant as it enters the steam in said chamber, substantially as described.

4. The combination with a steam-chamber, of a conduit for lubricant operatively connected therewith, and a closure on the end of said conduit in said steam-chamber, adapted to open automatically according to the pressure of the lubricant, substantially as described.

Signed at New York city this 9th day of July, 1906.

CHARLES S. BAVIER.

Witnesses:
HENRY H. DE VOS,
WALTER N. HARRIS.